Dec. 6, 1955    R. E. SHVETZ    2,725,997
WHEEL-SETTER

Filed Jan. 29, 1953    2 Sheets-Sheet 1

INVENTOR.
ROMAN E. SHVETZ
BY Robert Irving Williams
ATTORNEY

Dec. 6, 1955  R. E. SHVETZ  2,725,997
WHEEL-SETTER

Filed Jan. 29, 1953  2 Sheets-Sheet 2

INVENTOR.
ROMAN E. SHVETZ
BY Robert Irving Williams
ATTORNEY

2,725,997

WHEEL-SETTER

Roman E. Shvetz, New York, N. Y.

Application January 29, 1953, Serial No. 333,913

4 Claims. (Cl. 214—331)

This invention relates to wheel-setters for use in the changing of the wheel and tire of an automobile.

The construction of modern automobiles and the size and weight of the tires and wheels thereof have made it impractical for most drivers to "change tires" themselves, since it requires a great deal of strength and much skill to get a tire and wheel in under the mudguard and onto the hub-bolts.

With the foregoing and other considerations in view, the present invention contemplates the provision of means whereby a spare tire may be brought easily into position without requiring the driver to carry the weight of the tire while he works it on the hub-bolts.

Pursuant to the invention, there is provided a wheel-retaining wheel-setter including retaining means shaped to hold a wheel, elevating means, means for operating the elevating means, and roller means whereby the wheel-setter with a wheel thereon may be easily and quickly moved toward the wheel-hub of an automobile. In certain of its more specific aspects the invention contemplates the provision of means whereby a wheel-carrying carriage may be rolled to the hub of an automobile, whereby vertical and longitudinal adjustments in the position of the wheel may then be made, and whereby the wheel may be readily rotated while supported on the carriage.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawings, in which.

Figure 1:
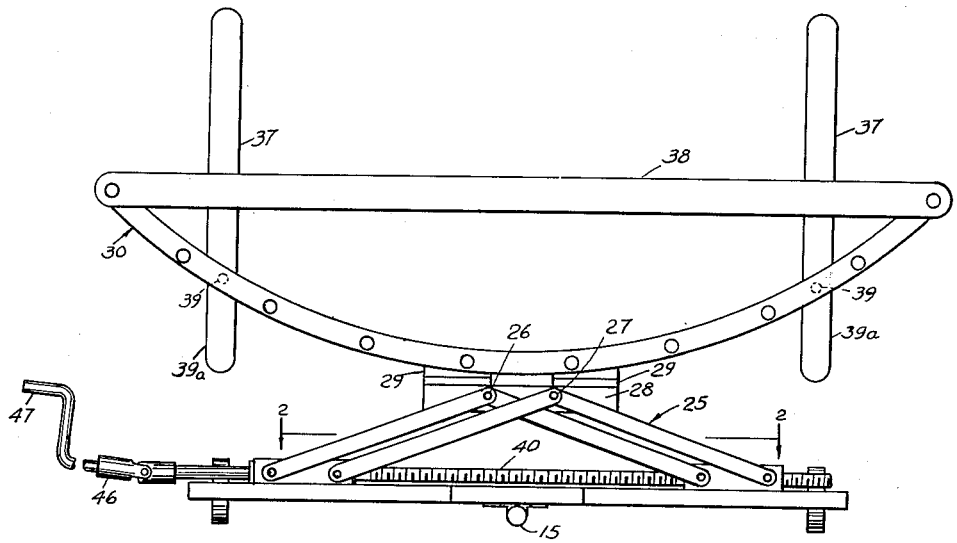
Figure 1 is a side view of a wheel-setter embodying the invention.
Figure 2:
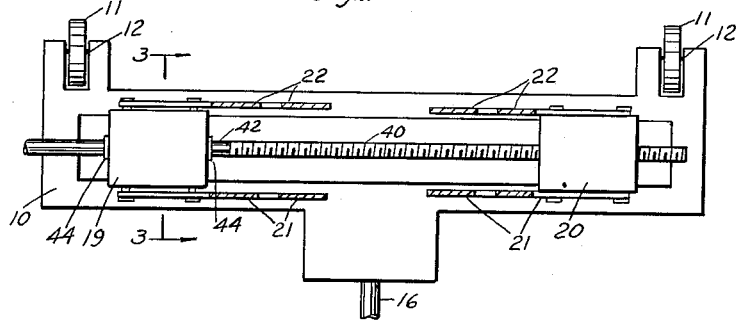
Fig. 2 is a horizontal section along the line 2—2 of Fig. 1.
Figure 4:
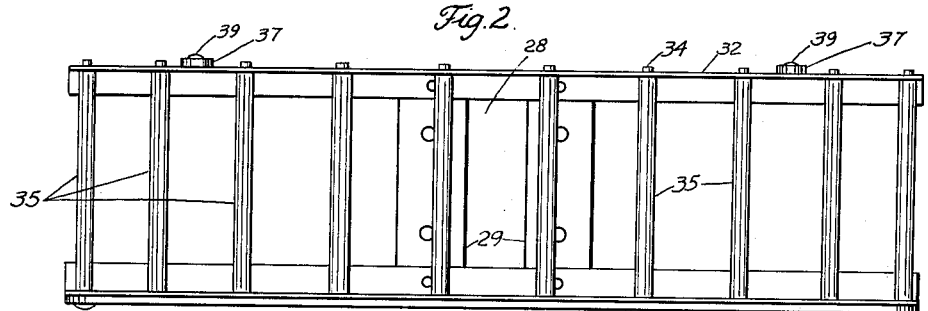
Fig. 4 is a top view of the carriage of the wheel-setter.
Figure 3:
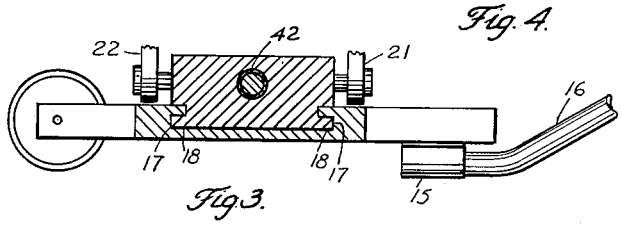
Fig. 3 is a section along the line 3—3 of Fig. 2.
Figure 5:
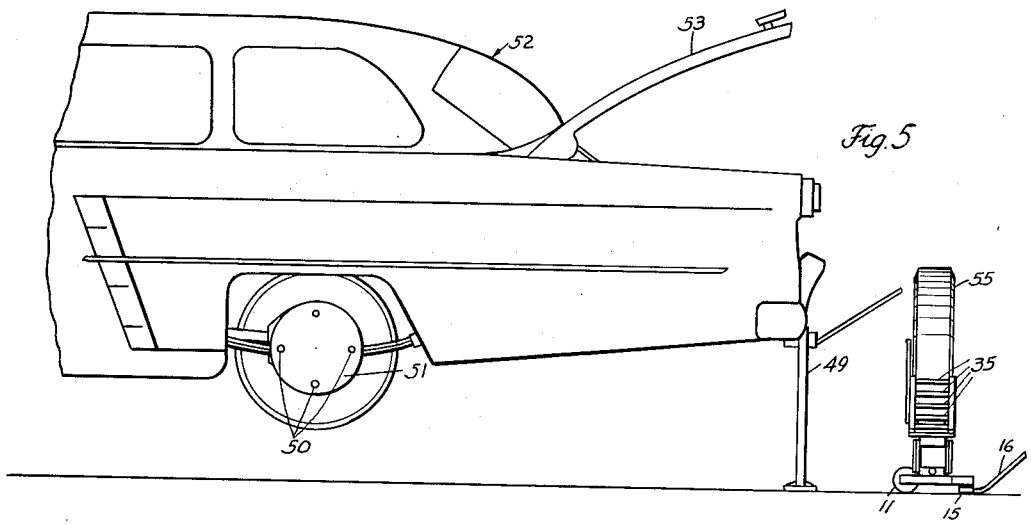
Fig. 5 is a side view of an automobile showing the wheel on the wheel-setter ready for use.
Figure 7:
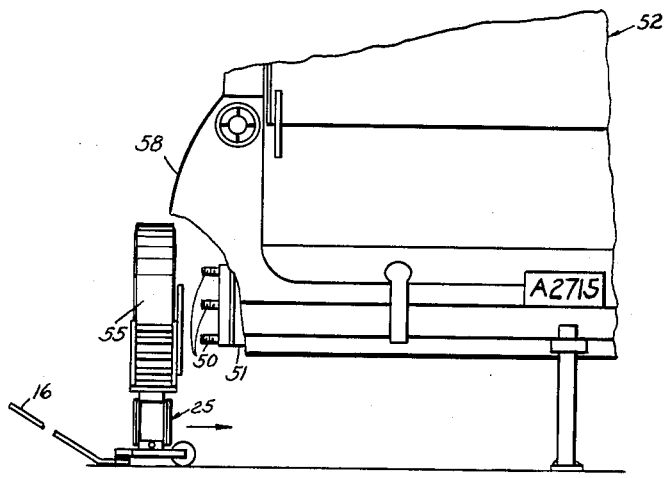
Fig. 7 is a rear view thereof.

The exemplified embodiment of the invention comprises a frame 10 equipped with rotary supporting means in the form of rollers 11 on shafts 12, and formed, in the present instance, with a socket 15 adapted to receive a handle 16 (Figs. 3, 5, and 7). The frame is formed with tracks 17 for guiding portions 18 of blocks 19 and 20 on each of which are pivotally-mounted pairs of front arms 21 and of rear arms 22 of a position-adjusting mechanism 25. One of the pairs of front arms is pivotally connected on a pivot pin 26, and the other pair on a pivot pin 27, and the pairs of rear arms are similarly connected by pins 26 and 27. The pins 26 and 27 are mounted in a platform 28 carrying blocks 29 which supports a carriage 30 comprising a front arcuate strip 31, a rear arcuate strip 32, and inter-connecting shafts 34 on which are mounted rollers 35. Extending vertically upwardly from spaced portions of the strip 32 are uprights 37 and inter-connecting the portions of the strip 31 is a horizontal guard 38. A wheel may thus be held in place on the rollers 35 by means of the uprights 37 and the guard 38. The arms 37 are pivotally, but frictionally, mounted at 39 to the strip 32 to permit their being moved out of the way after a wheel with its tire has been put into place. In order to facilitate the swinging of these arms on their pivots they are provided with downward extensions 39a, which may be knocked sideways as by the handle 16 or the crank 47 after the wheel has been put in place on the hub.

In order to operate the adjusting means, there is provided a screw 40 which is threaded thru the block 20. The screw shaft 42, in the present instance, is rotatably mounted in the block 19, being secured against longitudinal movement relative thereto by collars 44. At the end of the screw shaft is a pivoted socket 46 adapted to receive a hand crank 47.

Figure 6:
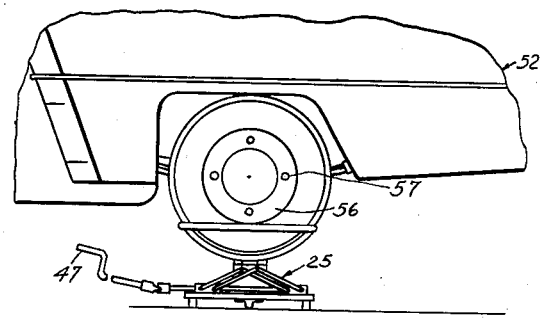
Fig. 6 is a fragmentary side view showing the wheel-setter in use.

In operation, after a deflated tire has been lifted from the road, as by a jack 49, and removed from the bolts 50 (Fig. 7) of a hub 51 of an automobile 52, the trunk cover 53 may be lifted, the wheel-setter taken from the trunk and set up with its rollers 11 and the socket 15 on the ground. The spare tire 55 with its wheel 56 may then be removed from the trunk and set upon the carriage 30. By lifting the handle 16, the wheel-setter may be readily moved on the rollers 11, so as to bring it from, for example, the position of Fig. 5 to the position of Figs. 6 and 7. The wheel-setter may then be moved on the rollers 11 to a position under the mudguard 58, whereupon the carriage may be elevated or dropped as may be necessary, to bring about a vertical alignment of the wheel 56 and the hub 51. Their horizontal alignment may be secured by shifting the screw-shaft 42 and the blocks 19 and 20 horizontally, the portions 18 having a suitable frictional sliding fit so that the blocks may be easily moved in their tracks 17 when horizontal pressure is applied as on the crank 47 but will normally remain in the horizontal position to which they are moved. The proper alignment of the wheel and hub having been obtained, the wheel holes 57 may be aligned with the hub-bolts 50 by rotating the wheel on the rollers 35 any required distance. The wheel-setter may then be moved inwardly far enough to get the tire bolts 50 thru the holes 57, after which the crank 47 may be turned to move the blocks 19 and 20 apart sufficiently to disengage the wheel and tire. The portions 39a of the uprights 37 may then be knocked sideways to bring the uprights below the level of the tire, so as to enable the wheel-setter to be moved out of the way. In this manner the spare tire may be put into place with a minimum of effort and in a simple and effective manner.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

1. A wheel-setter comprising a cradle having laterally extending side members and a base extending arcuately downwardly between the end portions of said side members and comprising transverse tire-supporting rollers, a cradle-suporting carriage, rotary supporting means for the carriage, elevating means for supporting the cradle on the carriage, and handle means for operating said elevating means.

2. A wheel-setter as set forth in claim 1 wherein the handle means extends longitudinally of the cradle at a point adjacent one end thereof so as to be operable from a position adjacent the car from which a wheel is to be removed or on which a wheel is to be placed.

3. A wheel-setter as set forth in claim 1 wherein there is provided means extending from one side of the wheel-setter transversely thereof for moving said wheel-setter on said rotary means to bring the same into place.

4. A wheel-setter as set forth in claim 3 wherein there are provided on the other side of the wheel-setter uprights extending above said side members.

References Cited in the file of this patent

UNITED STATES PATENTS

| | | |
|---|---|---|
| 1,986,129 | Whitehead | Jan. 1, 1935 |
| 2,429,723 | Kelley | Oct. 28, 1947 |
| 2,492,853 | Flynn | Dec. 27, 1949 |
| 2,554,494 | Hodgin | May 29, 1951 |
| 2,569,050 | Gref et al. | Sept. 25, 1951 |
| 2,576,627 | Miner | Nov. 27, 1951 |